US012667864B2

(12) United States Patent
Doppstadt

(10) Patent No.: US 12,667,864 B2
(45) Date of Patent: Jun. 30, 2026

(54) DEVICE FOR SEPARATING FEED MATERIAL

(71) Applicant: USG Umweltservice Gmbh & Co. KG, Velbert (DE)

(72) Inventor: Ferdinand Doppstadt, Velbert (DE)

(73) Assignee: USG Umweltservice GmbH & Co. KG, Velbert (DE)

( * ) Notice: Subject to any disclaimer, the term of this patent is extended or adjusted under 35 U.S.C. 154(b) by 92 days.

(21) Appl. No.: 18/837,707

(22) PCT Filed: Aug. 18, 2023

(86) PCT No.: PCT/EP2023/072806

§ 371 (c)(1), (2) Date: Aug. 12, 2024

(87) PCT Pub. No.: WO2024/132236

PCT Pub. Date: Jun. 27, 2024

(65) Prior Publication Data

US 2025/0161989 A1 May 22, 2025

(30) Foreign Application Priority Data

Dec. 22, 2022 (DE) ..................... 10 2022 004 864.7

(51) Int. Cl.
*B07B 1/15* (2006.01)
*B07B 1/00* (2006.01)

(52) U.S. Cl.
CPC ................ *B07B 1/15* (2013.01); *B07B 1/005* (2013.01)

(58) Field of Classification Search
CPC .. B07B 1/15; B07B 1/005; B07B 1/12; B07B 1/45

(Continued)

(56) References Cited

U.S. PATENT DOCUMENTS

| | | | |
|---|---|---|---|
| 1,641,777 | A | 9/1927 | Newhouse |
| 3,117,671 | A | 1/1964 | Pearce et al. |

(Continued)

FOREIGN PATENT DOCUMENTS

| | | | |
|---|---|---|---|
| CN | 112275608 | A | 1/2021 |
| DE | 202019000703 | U1 | 3/2019 |

(Continued)

OTHER PUBLICATIONS

International Search Report for International Application No. PCT/EP2023/072806, mailed Nov. 28, 2023.

(Continued)

*Primary Examiner* — Michael Mccullough
*Assistant Examiner* — Jessica L Burkman
(74) *Attorney, Agent, or Firm* — Jason H. Vick; Amped IP LLC

(57) ABSTRACT

The invention relates to a device (1) for separating feed material (2) for separating a first fraction (3) comprising moist, slippery, slimy, kneadable, dough-like, cohesive and/or tough soils and/or soil materials, preferably clay-containing or clay-like adhesions, further preferably intended for use in a quarry, with a plurality of rotary elements (4) designed as helical screws, wherein a rotary element (4) has a shaft (5) and at least one helix (6) extending spirally around the shaft (5). According to the invention, at least one entraining element (8) arranged on the outer surface (7) of the shaft (5) and projecting from the outer surface (7) of the shaft (5) is provided for entraining and/or separating the first fraction (3).

19 Claims, 13 Drawing Sheets

Figure 1:
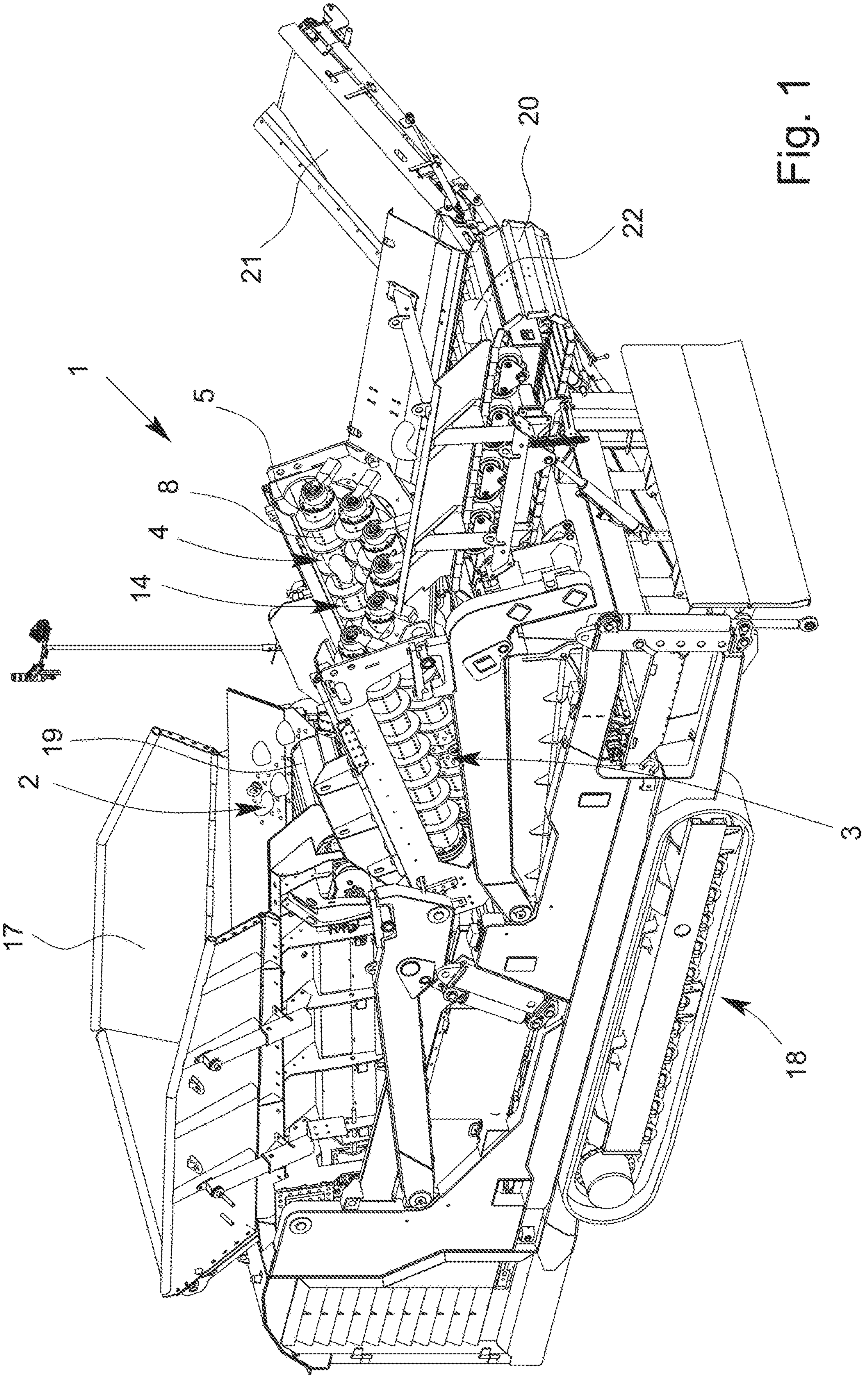

(58) Field of Classification Search
USPC .......................................................... 209/261
See application file for complete search history.

(56) References Cited

U.S. PATENT DOCUMENTS

| | | | | |
|---|---|---|---|---|
| 11,684,952 | B2 * | 6/2023 | Schons | B07B 15/00 209/279 |
| 2006/0085212 | A1 * | 4/2006 | Kenny | B03B 9/06 705/308 |
| 2007/0227953 | A1 * | 10/2007 | Paron | B07B 1/15 209/272 |
| 2015/0290681 | A1 * | 10/2015 | Guenther | B07B 1/145 37/444 |
| 2019/0388937 | A1 * | 12/2019 | Doppstadt | F16C 27/066 |
| 2025/0050380 | A1 * | 2/2025 | Rafferty | B07B 1/145 |

FOREIGN PATENT DOCUMENTS

| | | | |
|---|---|---|---|
| DE | 102018108511 | B3 | 9/2019 |
| GB | 376273 | A | 6/1932 |

OTHER PUBLICATIONS

Written Opinion for International Application No. PCT/EP2023/072806, mailed Nov. 28, 2023.
International Preliminary Examination Report for International Application No. PCT/EP2023/072806, mailed Jun. 11, 2024.

* cited by examiner

DEVICE FOR SEPARATING FEED MATERIAL

CROSS-REFERENCE TO RELATED APPLICATIONS

This application is a national stage application under 35 U.S.C. 371 of PCT Application No. PCT/EP2023/072806 having an international filing date of 18 Aug. 2023, which designated the United States, which PCT application claimed the benefit of German Patent Application No. 10 2022 004 864.7, filed 22 Dec. 2022, each of which are incorporated herein by reference in their entirety.

The invention relates to a device for separating feed material for separating a first fraction comprising moist, slippery, slimy, kneadable, dough-like, cohesive and/or tough soils and/or soil materials, preferably clay-containing or clay-like adhesions, further preferably intended for use in a quarry. The device has a plurality of rotary elements designed as helical screws.

The invention relates in particular to the technical field of sorting and/or classifying feed material, especially in the field of waste separation. A clean and/or sufficiently precise separation of the feed material into different fractions results in the possibility of being able to utilize different fractions of the feed material directly or to feed them to different post-treatment processes. For example, large and/or elongated parts can be separated from smaller particles and/or components of the feed material.

In the context of the invention, the term "separating" includes both classifying and sorting. In this context, classifying is to be understood as a mechanical separation process for mixtures of solids, wherein different geometric features, for example size, are exploited for the separation process. In this process, separation can take place into coarse and fine material, among other things. In this context, sorting is understood to be a mechanical separation process in which a mixture of solids with different material characteristics is divided into fractions with the same material characteristics. Suitable criteria for sorting are, for example, the density, color, shape and wettability or magnetizability of the feed material. Accordingly, the term separation in the present invention includes a separation of the feed material so that a division into different fractions can be made. Mostly, this separation and/or fractionating is used for the preparation of recycled material or for the classification of at least substantially solid material.

The disadvantage of prior art separating devices is that they ensure only insufficient to maximum sufficient separation efficiency of the feed material, which for example consists of stones, in particular limestone, with clay-containing adhesions. A prior art separating device used in this area is generally not designed to separate and/or separate off the clay-containing adhesions from the stone surface sufficiently well.

Even in the case of other tough soil materials adhering to larger components, the known separating device cannot enable sufficiently adequate separation of these adherents. This leads to the fact that further equipment has to be used for the separation of such adhesions and the entire process sequence, especially in a quarry, for obtaining a cleanly separated fraction with large-shaped components, such as stones, which are at least substantially free of adhesions, is very complex and cost-intensive.

It is now the object of the present invention to avoid the aforementioned disadvantages of the prior art or at least to reduce them substantially.

The aforementioned object is solved by a device for separating feed material according to claim 1.

The device according to the invention for separating feed material is provided for separating a first fraction and is preferably used in a quarry. The first fraction is formed by moist, slippery, slimy, kneadable, dough-like, cohesive and/or tough soils and/or soil materials, in particular clay-containing adhesions. In this regard, the first fraction may adhere to a second and/or further fraction prior to being fed to the device and may be separated from the further fraction by the device. The further fraction can then also be separated by the device. Preferably, the further fraction is composed of large-sized components, such as stones. The first fraction can then represent, in particular, adhesions to the further fraction.

According to the invention, the device has a plurality of rotary elements in the form of helical screws, wherein a rotary element has a shaft and at least one helix extending spirally around the shaft.

According to the invention, it is provided that—in addition to the helix—at least one entraining element arranged on the outer surface of the shaft and projecting from the outer surface of the shaft is provided for entraining and/or separating the first fraction.

The entraining element according to the invention, which is provided on the shaft independently of or in addition to the screw helix, means that the first fraction can in any case be separated quite predominantly from the feed material. As a result, the entraining element represents an additional means of capturing the first fraction and enabling it to intervene in the further fraction transported via the rotary elements and/or via the screen deck formed by the rotary elements.

The entraining elements according to the invention ultimately result in particular in the first fraction being drawn through and/or squeezed through and/or into the free spaces between the rotary elements. Functionally, this can be compared to a pasta machine in which the material is pressed and/or squeezed through a corresponding free space. The entraining elements now ensure that, in addition to the helix, another means is arranged on the shaft which can contribute to the separation of the first fraction.

According to the invention, it is possible in particular to drastically simplify lime extraction in a quarry. In practice, it is the case that clay inclusions are regularly present in the limestone, which have to be separated during the quarrying of limestone. Such separation is now made possible by the separating device according to the invention. For this purpose, the screen deck can be preceded by a feed hopper and/or a conveying device, which feeds the feed material to the separating device. Subsequently, the separation into two fractions takes place, namely on the one hand on the upper side of the screen deck, which can serve for the separation of the further fraction, which can be formed by stones or the like, and on the other hand on the lower side of the screen deck, wherein on the lower side the clay-containing materials can be separated in particular as separating grain.

In particular, separation thus does not take place according to density, but separation of the fractions also takes place on the basis of the viscosity of the material, in particular of hard and soft. The soft material, which is in particular a cohesive soil, can be guided through the free space between the rotary elements by engagement and by entrainment of the entraining elements and thus ultimately separated as undersize material.

Preferably, the rotary elements rotate at between 50 to 200 rpm, in particular from about 100 rpm +/−20%.

Preferably, the entraining element is provided to extend at least substantially in the longitudinal direction of the shaft, more preferably at least substantially parallel to the longitudinal direction of the shaft or at an acute angle thereto, on the outer surface of the shaft. In this regard, the entraining element may be configured to ensure improved engagement with the adherent first fraction. By extending at least substantially in the longitudinal direction (by which is also understood an oblique arrangement at an acute angle of less than 20° with respect to the longitudinal direction), it can be ensured that this engagement can also take place in the direction of conveying for the further fraction or along the longitudinal direction of the rotary elements. By means of the screw spirals, a conveying direction from one end face of the rotary elements to the other end face is ultimately specified by rotation of the rotary elements. This conveying direction thereby also runs in particular at least substantially in the longitudinal direction of the shaft, preferably parallel thereto, so that the arrangement of the entraining element at least substantially in the longitudinal direction of the shaft is also advantageous with regard to the conveying direction of the further fraction. The first fraction is thereby to be separated from the further fraction, which is transported along the conveying direction. Thus, an engagement via the entraining element can take place particularly advantageously over, in particular, a large transport path in the conveying direction for the further fraction.

In a further preferred embodiment, it is provided that at least one separate entraining element is arranged between adjacent turns of the helix in each case. In particular, a plurality of separate entraining elements can also be arranged between the same pair of adjacent turns and/or between further adjacent turns. In this context, it is understood that a separate entraining element is arranged in particular between directly adjacent turns of the helix. The entraining element can thereby particularly preferably at least substantially bridge the distance between the adjacent turns.

Preferably, between 2 to 10, preferably 3 to 5, entraining elements, in particular at least substantially equally spaced, are arranged between two directly adjacent turns in the circumferential direction—thus, in particular, once around the shaft by 360°. In the course of the development of the invention, it has been established in tests carried out that in particular between 3 to 5 entraining elements, which are provided spaced apart from one another, preferably equally spaced apart, over the circumference of the shaft, are particularly advantageous and ensure good entrainment of the first fraction.

It is particularly preferred that a plurality of entraining elements is arranged between each pair of immediately adjacent turns, so that a plurality of entraining elements can be provided along the entire longitudinal direction of the shaft.

In this context, the plurality of entraining elements between two directly adjacent turns ensures that, even when the rotary element is rotated, entrainment of the first fraction for separation from it can be ensured in a constant manner, in particular for dissolving a constituent adhering to the further fraction. Otherwise, an uneven separation behavior could result.

However, it is also possible for only one entraining element to be arranged between two adjacent turns. Even then, the advantageous entrainment effect for the first fraction still exists.

In a further particularly preferred embodiment, at least one pair of separate entraining elements arranged directly one behind the other in the longitudinal direction of the shaft is offset from one another. Such an offset results in particular from the next directly adjacent separate entraining element. It may also be provided that a plurality of separate entraining elements is arranged one behind the other in the longitudinal direction of the shaft, which are then all offset from one another. This offset can in particular be between 1 mm to 80 mm transverse to the longitudinal direction of the shaft, preferably between 10 mm to 30 mm and in particular 20 mm +/−5 mm. Such an offset results in the advantage that a uniformity of the torque decrease per revolution of the screw helix and/or the rotary element can be ensured during operation. Accordingly, the offset arrangement can in particular achieve that, preferably along the conveying direction of the rotary elements, an at least substantially uniform separation behavior is achieved for the first fraction, which is preferably adapted with respect to the rotation of the rotary elements.

In this context, it is also particularly advantageous if, as previously explained, a plurality of separate entraining elements is provided over the circumference of the shaft in the circumferential direction. Particularly preferably, a plurality, in particular all, of separate entraining elements directly adjacent in the longitudinal direction of the shaft (i.e. the entraining elements which are closest to each other) are arranged offset to each other, preferably in such a way that a staircase structure results. This staircase structure can preferably be monotonically ascending and/or descending (depending on the viewing direction).

Preferably, the entraining element is formed in cross-section transversely to the longitudinal direction of the shaft, at least in some areas, in the shape of an arc segment at the end. Particularly preferably, the cross section transverse to the longitudinal direction of the shaft of the entraining element can be formed in particular as an arc segment. Such a formation results in particular from the application of the entraining element, which is applied in particular in the liquid state. The entraining element can be applied in particular in the liquid state to the already manufactured shaft as a build-up weld. Such a structure of the entraining element enables effective engagement with the first fraction for its deposition when the rotary element is rotated, and furthermore also permanent use of the entraining element, so that preferably sharp edges, which might otherwise be subject to high wear, can be at least substantially reliably avoided.

Alternatively or additionally, it can be provided that the entraining element is designed as a linear and/or bead-shaped elevation, in particular continuous and/or uninterrupted in the longitudinal direction of the shaft, between two adjacent helical sections. Such an uninterrupted design is understood in particular in such a way that each separate entraining element is particularly preferably uninterrupted, but in particular a plurality of entraining elements can be provided distributed over the longitudinal direction of the shaft.

In an alternative or additional preferred embodiment, the entraining element can also be designed as a strip-shaped web. In particular, this web can be designed as a separately manageable component which already has the appropriate shape before it is manufactured and can be subsequently applied to the shaft. Thus, instead of a build-up weld, the entraining element can also be designed as a separate strip-shaped component. Ultimately, the entraining element serves to have an additional component on the shaft for driving the first fraction.

Preferably, the entraining element has a thickness of at least 1 mm, preferably between 1 mm to 15 mm, more preferably from 2 mm to 6 mm. In particular, the thickness, preferably the maximum thickness, is 3 mm +/−0.5 mm. The thickness of the entraining element, in particular the maximum thickness of the entraining element, can preferably be less than the web height of the helix and in particular less than 10% of the web height of the helix, preferably less than 5% of the web height of the helix. The entraining element thus serves to entrain components of the first fraction that are in direct contact with the outer surface of the shaft.

In a further preferred embodiment, it is provided that the entraining element is connected to the shaft by a material bond and/or by a force fit and/or by a form fit. Particularly preferably, the entraining element is connected to the outer surface of the shaft only by a material bond, preferably by welding. In a further, likewise preferred embodiment, as an alternative to or in addition to a material bond connection between the entraining element and the outer surface of the shaft, a frictional connection and/or a form connection can also be provided. In this embodiment, the entraining element is designed in particular as a preferably web-shaped strip or the like, which can be connected to the outer surface of the shaft via appropriate connecting means. The advantage of such a design is that a detachable arrangement of the entraining element on the outer surface can be provided, so that in the event of wear of the entraining element in particular a corresponding replacement can be carried out.

Preferably, the material of the entraining element is wear-resistant steel, preferably with a grade of 300 HB to 600 HB, in particular 600 HB. Wear-resistant steels of the aforementioned type are characterized in particular by their high abrasion properties and enable long-term, low-wear use of the entraining element to be ensured.

Particularly preferably, the entraining element is designed as a build-up welding and/or armour-plating, in particular as a build-up weld seam and/or armour-plating seam. With such a design, it can be provided that in the event of any prevailing wear of the entraining element, a renewed application of the entraining element can be made possible. The build-up welding and/or armour-plating also provides an entraining element that can withstand high mechanical forces and is particularly good and/or resistant to wear.

Furthermore, it is preferred that the helix has a constant helix pitch over its length. In particular, the helices of all rotary elements have a constant, in particular at least essentially the same, helical pitch. However, the helices of the rotational elements can be formed differently. Thus, in particular, two groups of rotary elements can be provided, which preferably differ with regard to the direction of their helices, as will be explained below with regard to the counterclockwise and clockwise arrangement of the rotatary elements.

In addition, preferably between 3 and 20, in particular between 4 and 10, rotary elements are provided. In particular, the rotary elements are arranged adjacent to one another. Preferably, the helices of directly adjacent rotary elements interlock and/or mesh with each other. In particular, in a meshing arrangement, a distance is also provided between the upper edge of the helix and the immediately adjacent shaft of the adjacent rotary element. This distance can in particular indicate the separation grain size and is preferably a few millimeters.

Preferably, the rotary elements are arranged and/or mounted in such a way that they form a trough-shaped and/or curved screen deck that is recessed towards the center. It is particularly preferred that such an arrangement allows the feed material to remain in the recessed trough area of the screen deck and preferably to be conveyed along the conveying direction.

It is particularly advantageous if at least two directly adjacent rotary elements are arranged in a counterclockwise direction and at least two further directly adjacent rotary elements are arranged in a clockwise direction. In such an embodiment, it is understood that the helices of the left-turning and the right-turning rotary elements can have different designs, namely in particular in different directions of rotation. Preferably, the left-turning and the right-turning rotary elements can nevertheless have the same helix pitch. In particular, the counterclockwise rotary elements and the clockwise rotary elements are arranged in such a way that preferably two groups of rotary elements are provided, namely one group of adjacent rotary elements which are counterclockwise rotating and another group of adjacent rotary elements which are clockwise rotating. In particular, the groups can meet in the trough recess of a preferably curved screen deck, so that the counterclockwise and the clockwise rotary elements are particularly preferably arranged in such a way that they each rotate towards the center and thus lead in particular to conveying of the feed material into the central region of the screen deck. Accordingly, such an arrangement can increase the dwell time of the feed material on the screen deck and, in particular, lead to efficient separation of the first fraction.

In a further preferred embodiment, an adjusting device is provided for adjusting the angle of inclination of the screen deck from the feed end to the discharge end. In particular, the adjusting device can be designed in such a way that the inclination of the screen deck in relation to the substrate can be varied between 0° and 40°, preferably between 0.1° and 30°. By adjusting the inclination of the screen deck, it is also possible in particular to adapt to different feed materials. Thus, it may be advantageous that different inclinations to the substrate are more suitable for different feed materials, especially with regard to the heavy components of the second fraction that are subject to gravitational force. Thus, the dwell time on the screen deck of the feed material can also be increased or decreased by an adjustable inclination, in particular by a larger inclination, especially depending on the desired degree of separation of the first fraction.

Advantageously, the rotary elements forming the screen deck are arranged and designed in such a way that the feed material can be separated into at least two fractions, the first fraction being separable below the rotary elements and a further fraction being dischargeable above the screen deck, in particular via the discharge end of the rotary element. The second fraction can be discharged in particular via the front end of the rotary elements.

Corresponding conveying devices can also be provided for conveying away the first or the second and/or further fraction. As explained above, a conveying device, such as a feed hopper and/or a conveyor belt or the like, can also be used to feed the feed material.

Particularly preferably, the device is mobile. For example, it can have a chassis, in particular a crawler, with which the device can be driven and/or moved to different locations.

Preferably, a further entraining element is arranged in the area of the feed end of the rotary element—in particular accordingly outside the helix. The further entraining element can be arranged in particular in the region of the end of the rotary element facing the bearing and/or at the feed end of the rotary element, in particular behind a wall which protects the feed end from the feed material. The further entraining element can now be provided so that any components of the feed material that may enter this area can be conveyed back into the area of the screen deck or below the rotary elements. For this purpose, it is particularly advantageous if the further entraining element is arranged at an angle, in particular at an angle of between 4° and 30°, more preferably between 5° and 20° and in particular of 15° +/−3°, to the longitudinal direction of the shaft. The further entraining element can also be designed as a weld, in particular build-up weld and/or armour-plating, in particular build-up weld seam and/or armour-plating seam.

Further preferably, a wear element can be arranged on the upper edge of the helix at least in certain areas, preferably over the entire surface, and in particular extend at least substantially over the entire length of the helix. Preferably, the wear element can likewise be in the form of a build-up weld and/or armour-plating and/or build-up weld seam and/or armour-plating seam. The further wear element may protect the helix from mechanical stresses or the like. The thickness of the wear element can be between 1 to 10 mm, preferably between 3 to 7 mm and in particular at 3 mm +/−20%. The wear element thus leads to long-term use of the helix without mandatory replacement of the helix due to wear at the upper edge. The wear element can also be renewed as required in order to be able to use the rotary element for longer.

In a further preferred embodiment, a retention means is provided, which is preferably designed as a plate. In particular, the retaining means is designed and arranged in such a way that the dwell time of the feed material on the screen deck can be increased and/or enlarged, which preferably leads to improved separation of the first fraction. For this purpose, the retaining means is arranged in particular at the discharge end of the central rotary elements and prevents in particular premature discharge of the further fraction in this area. Preferably, the retaining means is arranged adjacent to the rotary elements. In particular, the retaining means extends over only part of the width of the screen deck and is especially preferably arranged in the trough depression of a curved screen deck.

Further, the present invention relates to the use of an apparatus of the foregoing type for separating feed material for separating a clay-containing soil in a quarry.

Furthermore, the present invention relates to a method for separating feed material using an apparatus of the aforementioned type, wherein a first fraction comprising moist, slippery, slimy, kneadable, dough-like, cohesive and/or tough soils and/or soil materials is separated. In particular, the first fraction comprises clay-containing or clay-like adherents. The rotary elements of the device rotate during operation, with the entraining elements entraining and/or separating the first fraction.

It is understood that with regard to particular advantages of the method according to the invention and/or the aforementioned use according to the invention, reference may be made to the aforementioned explanations concerning the device, which may now also apply in the same way to the use and/or the method. Also, the explanations for the use and/or the method may apply to the device-without the need for any further explicit explanation in this respect.

The process according to the invention is particularly advantageous, especially in a quarry, since it ultimately makes it possible to separate clay-containing adhesions from stones and/or large-sized components, especially limestone.

In the process according to the invention, it is provided that the feed material can be fed onto the screen deck formed by the rotary elements. By rotating the rotary elements, the feed material can then be conveyed in the conveying direction of the rotary elements. Conveying can also simultaneously cause the entraining elements to engage with the first fraction, which can be separated below the rotary elements. The further fraction can then be discharged via the end face of the rotary elements opposite the feed end. The further fraction may be composed of stones or large-sized components that are larger than the spacing formed between the rotary elements and/or larger than the separation grain size. The components of the first fraction are smaller than the separation grain size, but can only be reliably separated by the device according to the invention, as they would otherwise adhere to the further fraction due to their viscosity and adhesive properties.

Thus, the process according to the invention allows a safe separation of the clayey and/or cohesive soils, which can drastically simplify the entire process sequence in lime extraction.

Furthermore, it is expressly pointed out that all the above-mentioned and following intervals contain all the intermediate intervals and also individual values contained therein and that these intermediate intervals and individual values are to be regarded as essential to the invention, even if these intermediate intervals or individual values are not specified in detail.

Further features, advantages and possible applications of the present invention will be apparent from the following description of examples of embodiments based on the drawing and the drawing itself. In this context, all the features described and/or illustrated constitute the subject-matter of the present invention, either individually or in any combination, irrespective of their summary in the claims or their relation back.

Figure 2:
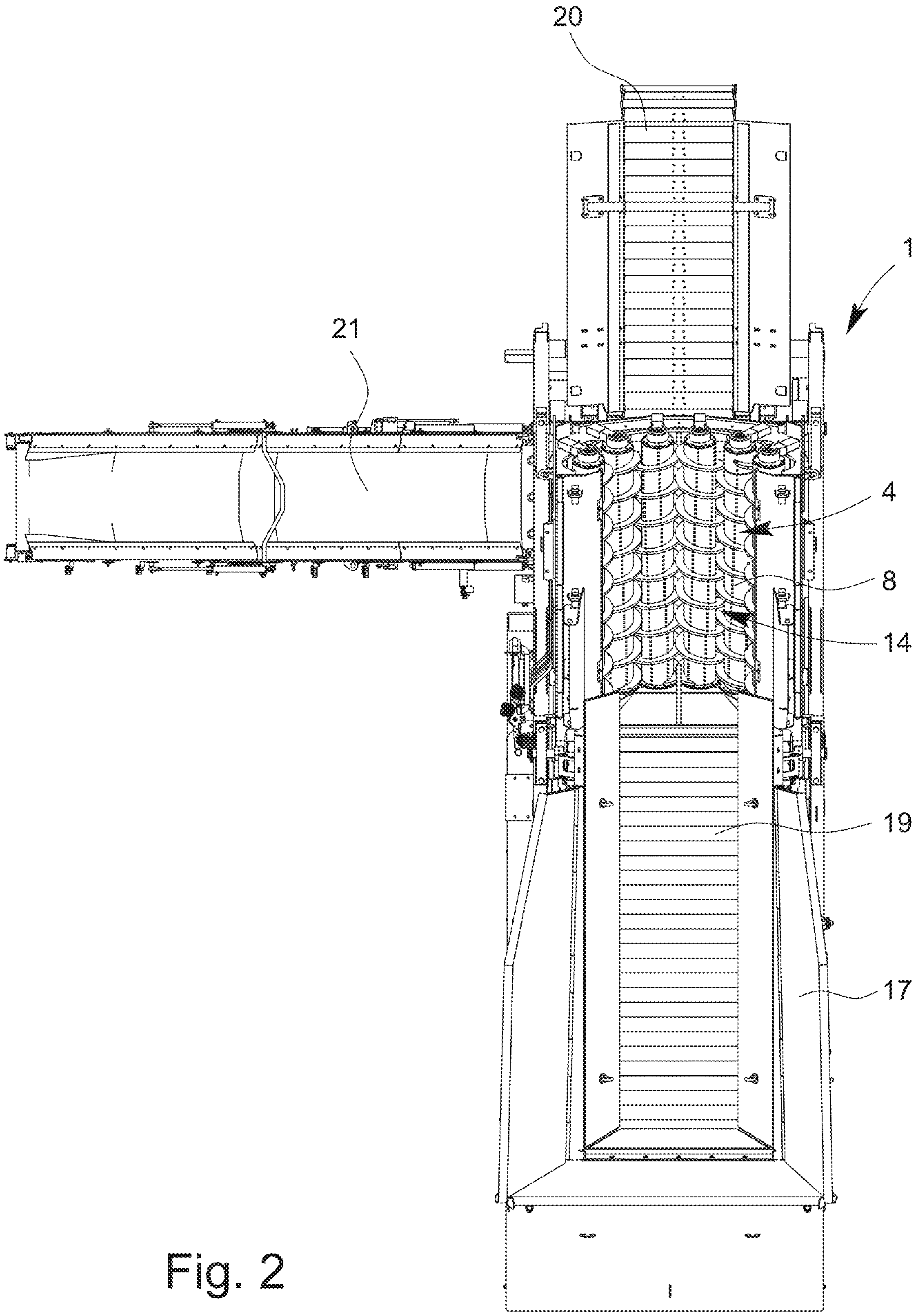
Figure 3:
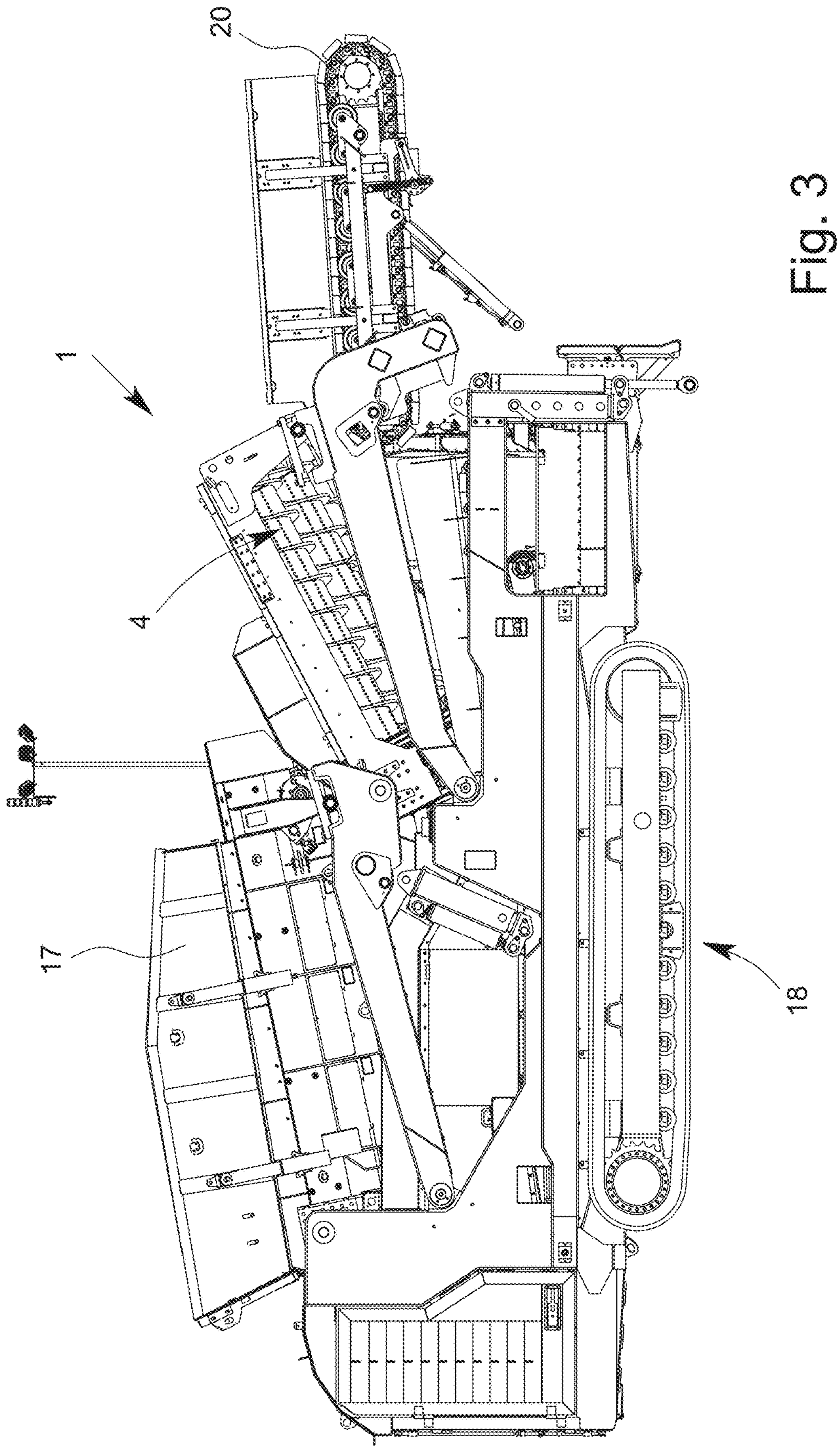
Figure 4:
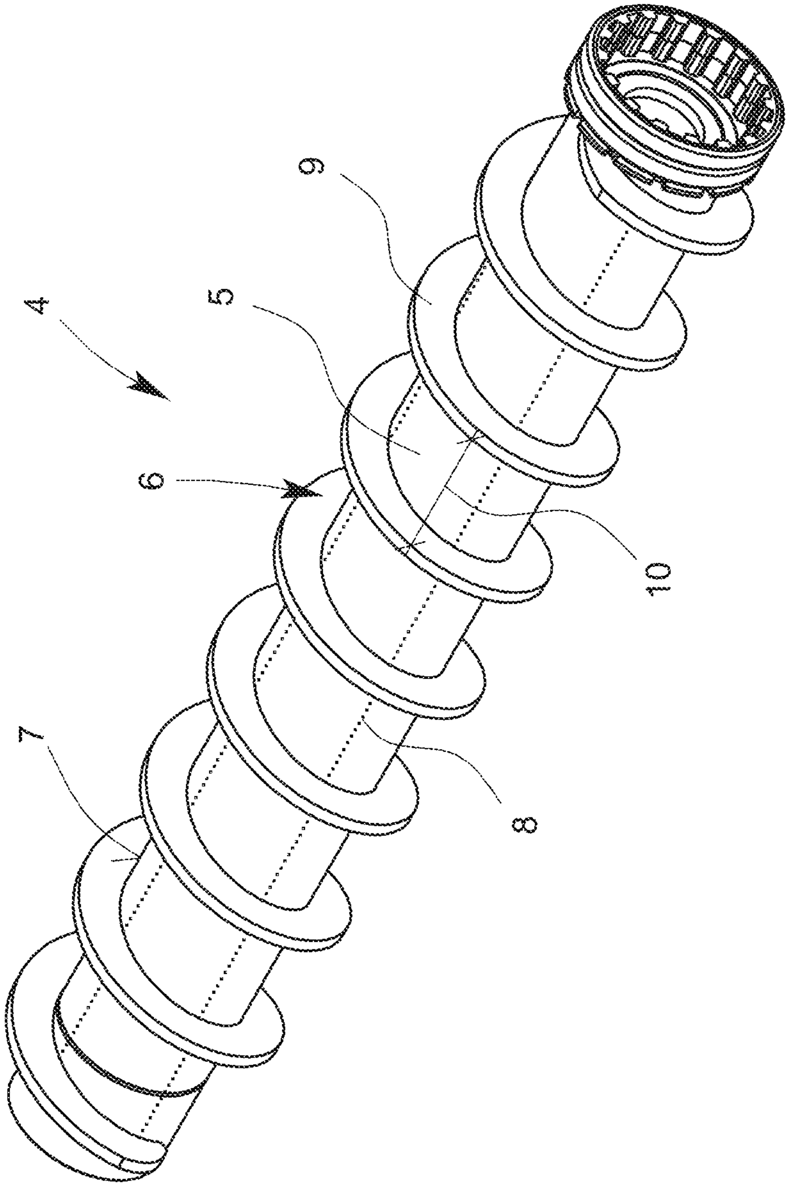
Figure 5:
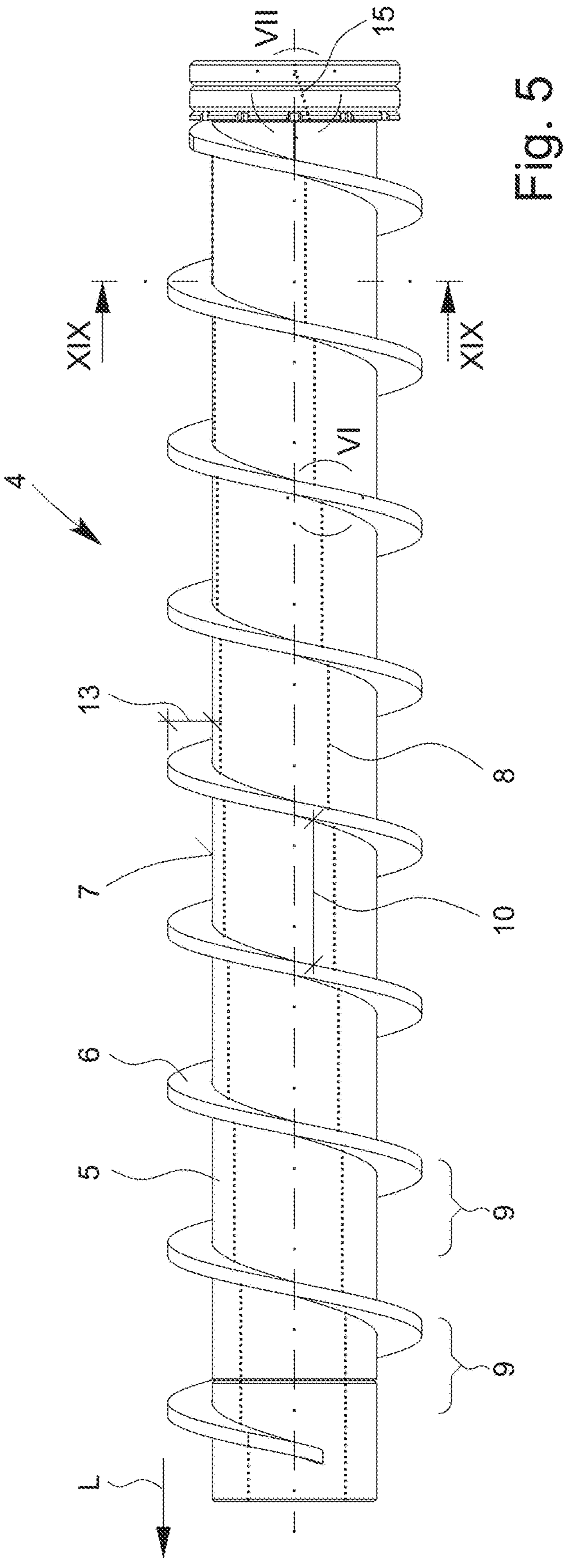
Figure 7:
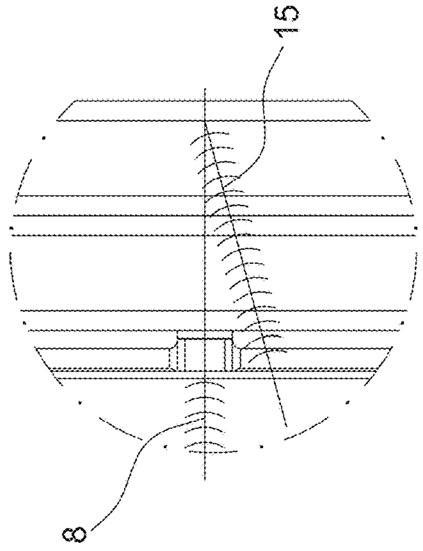
Figure 6:
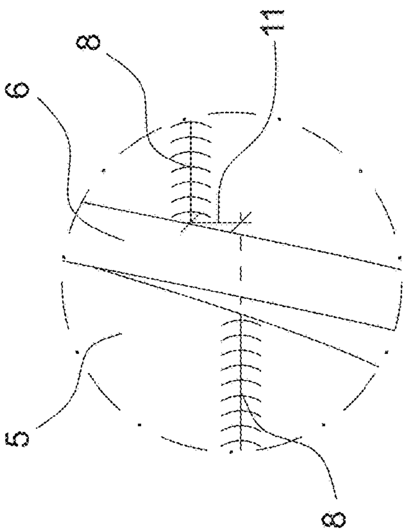
Figure 8:
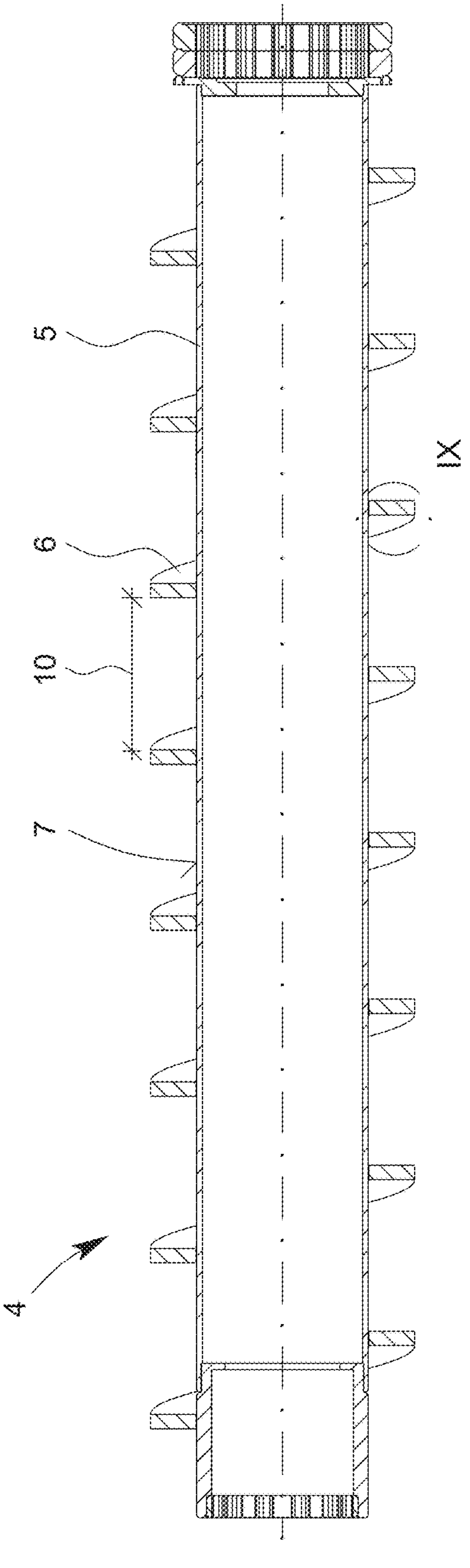
Figure 9:
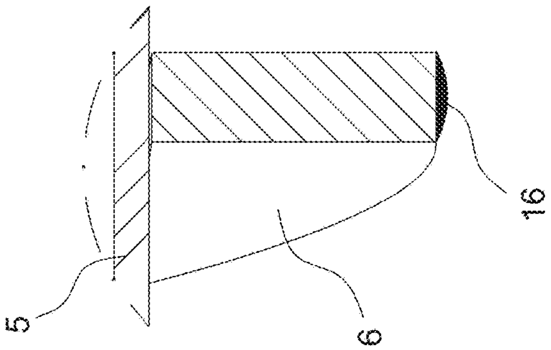
Figure 10:
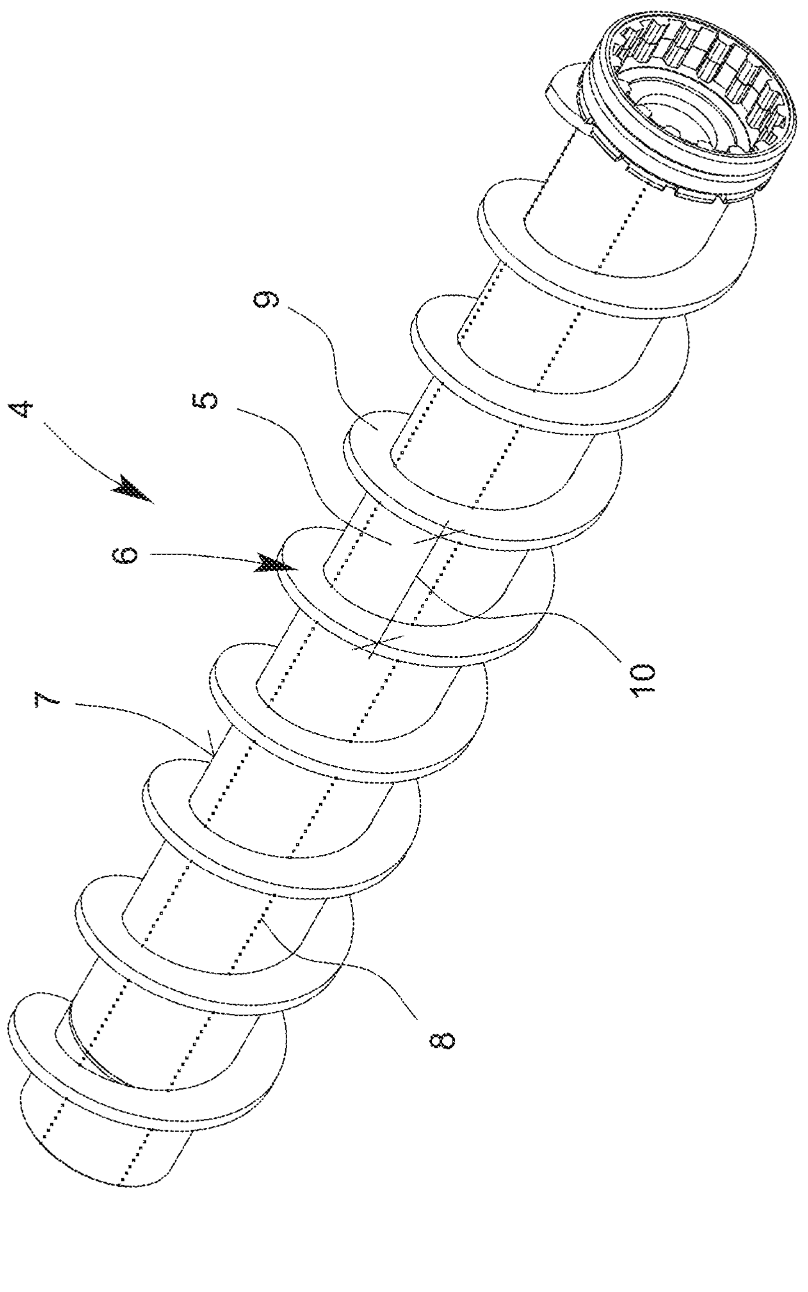
Figure 11:
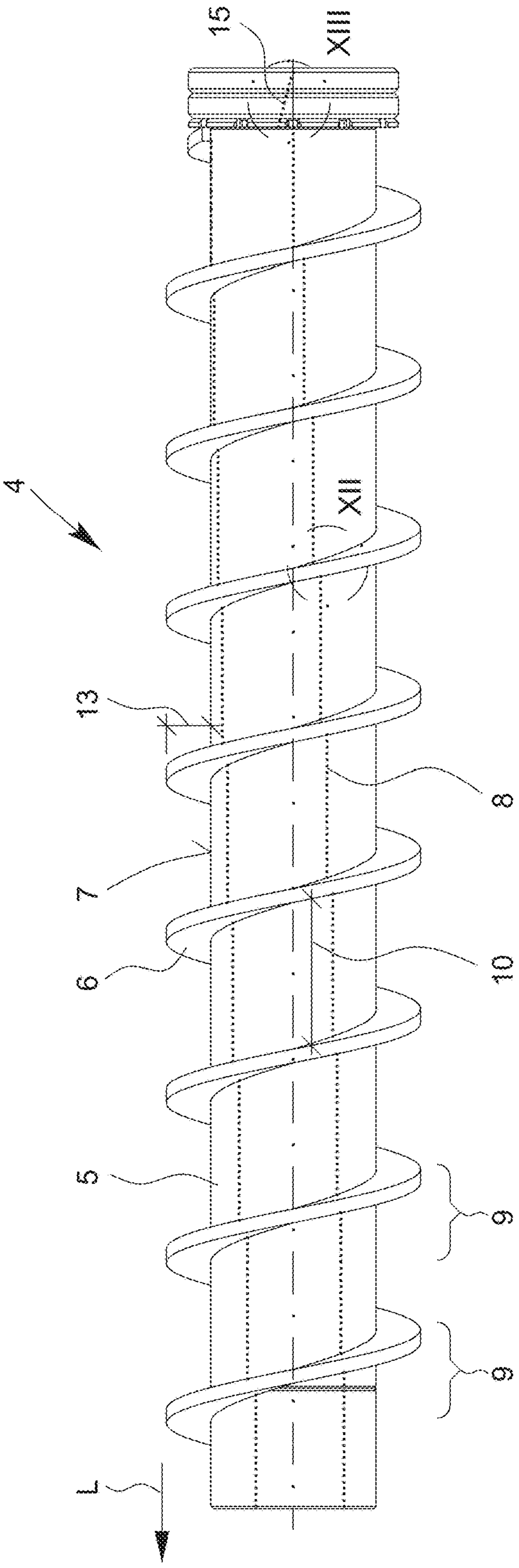
Figure 13:
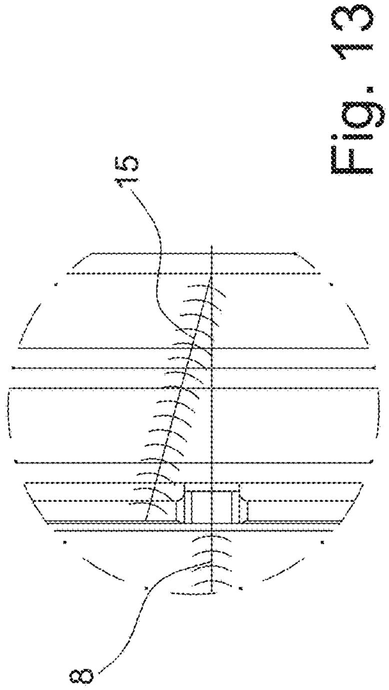
Figure 12:
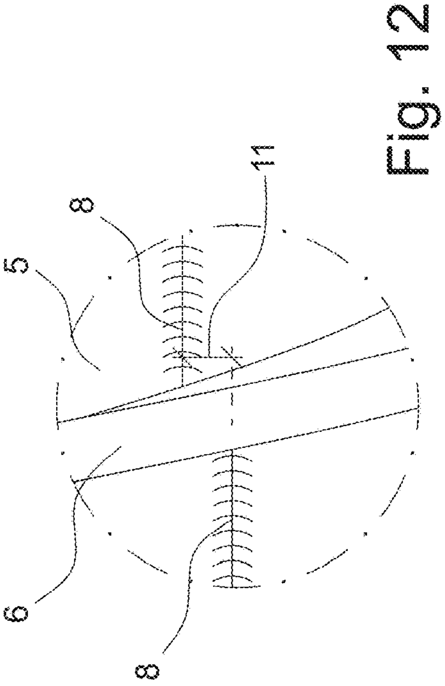
Figure 14:
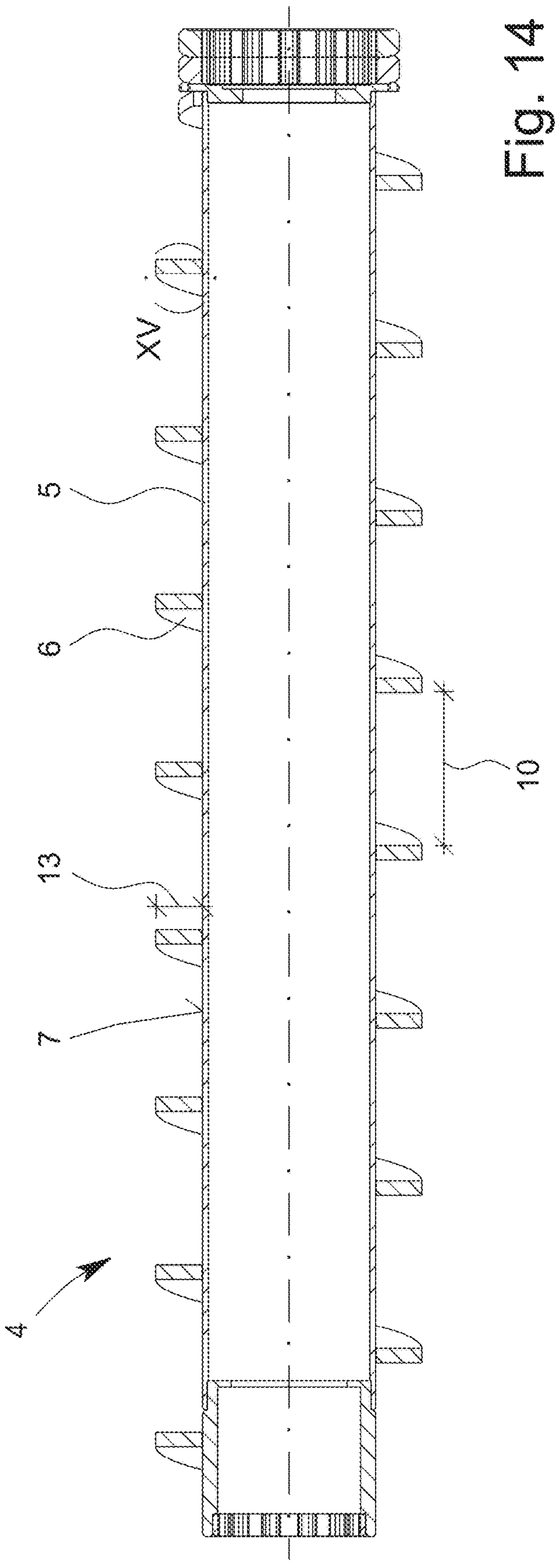
Figure 15:
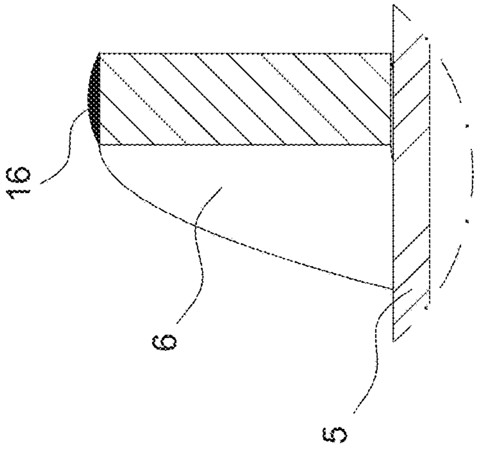
Figure 16:
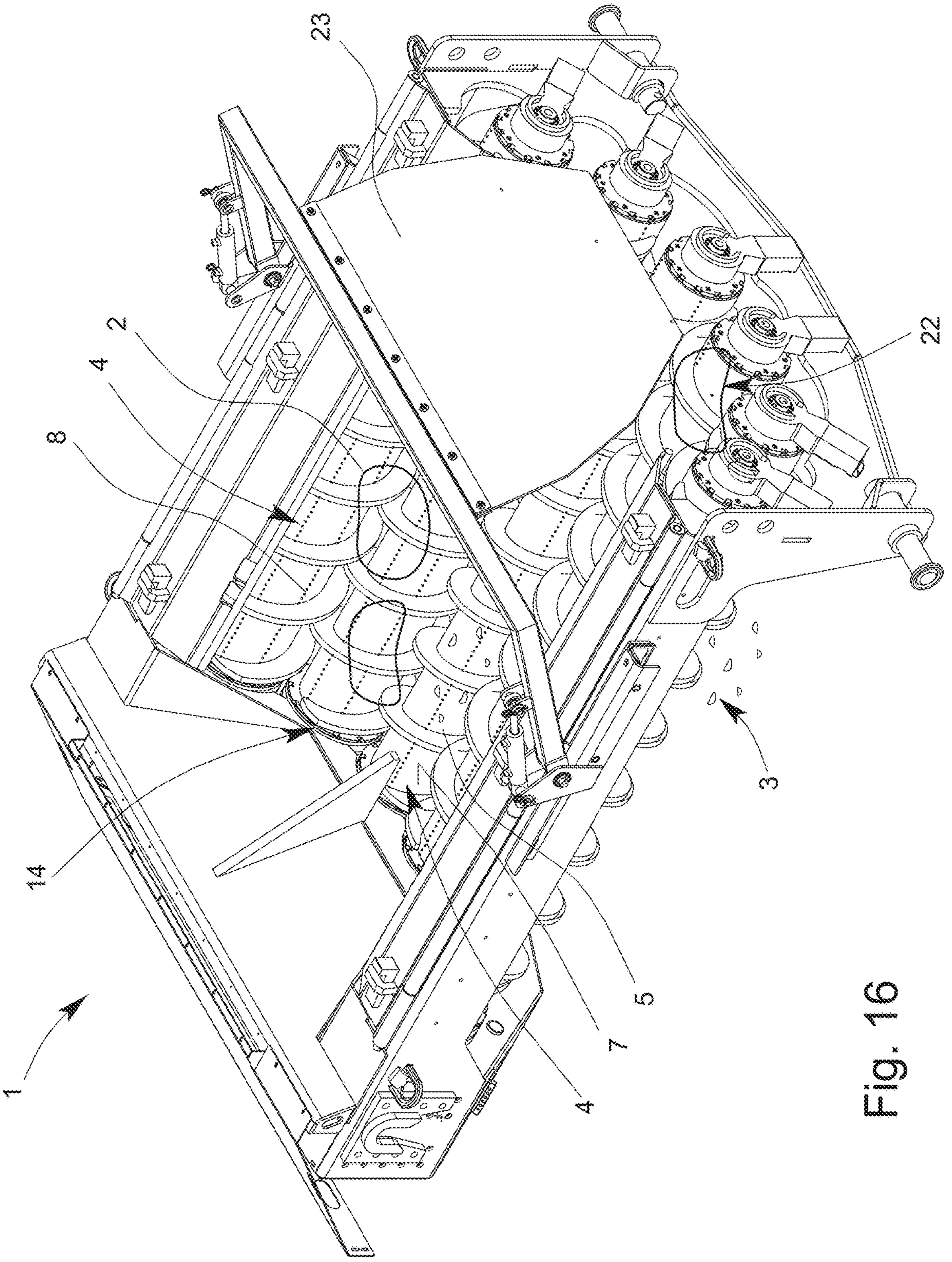
Figure 17:
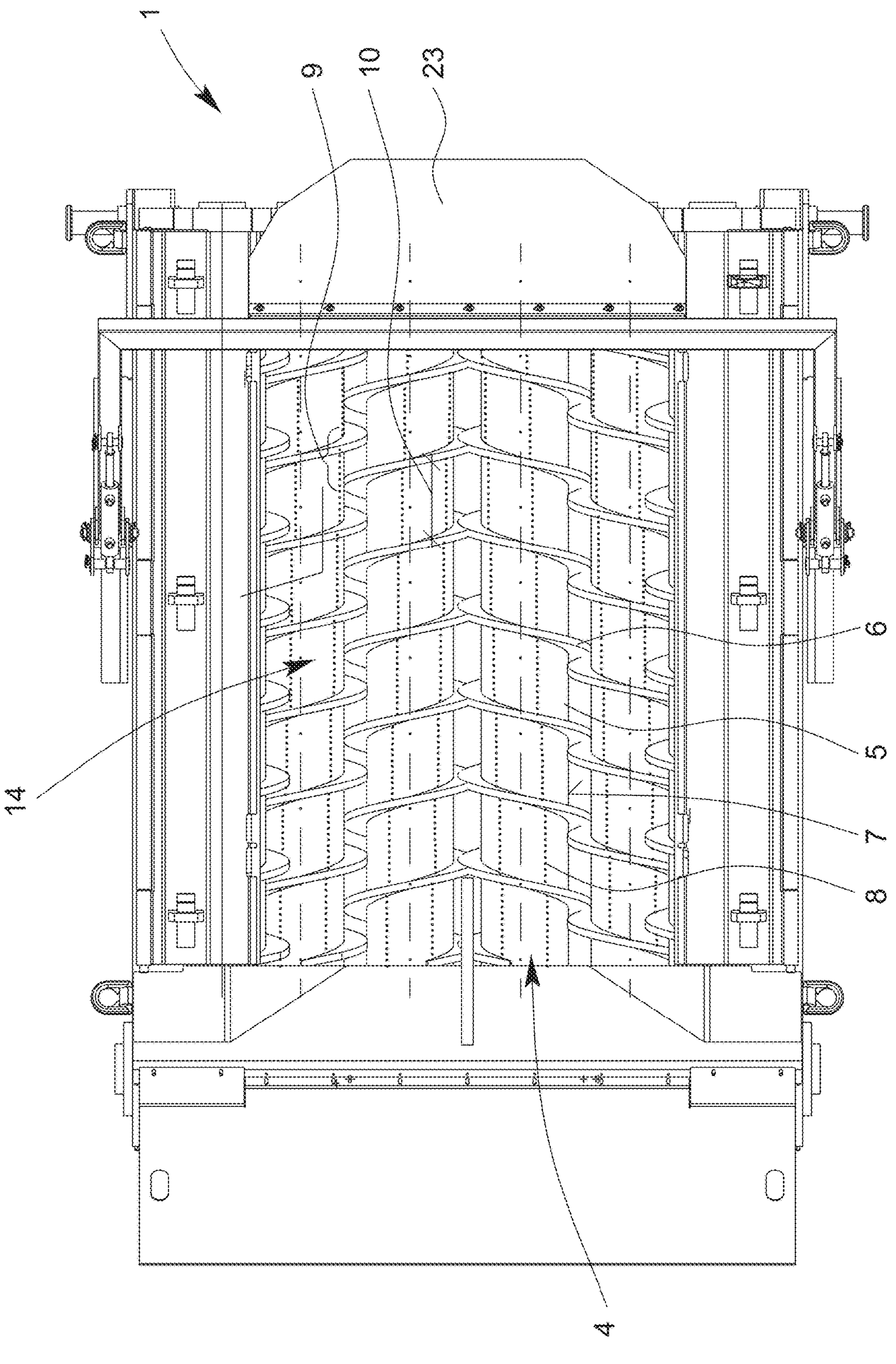
Figure 18:
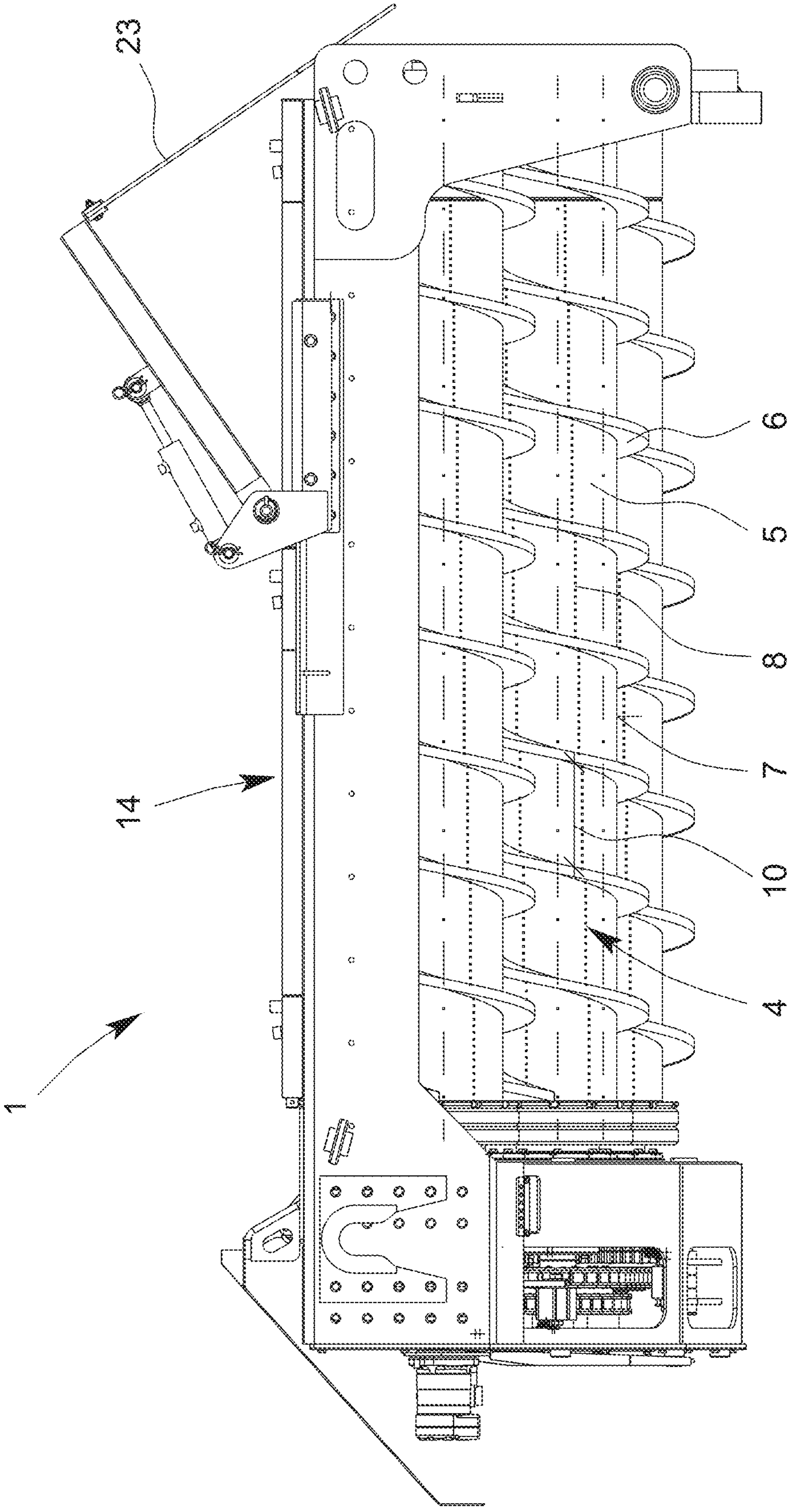
Figure 19:
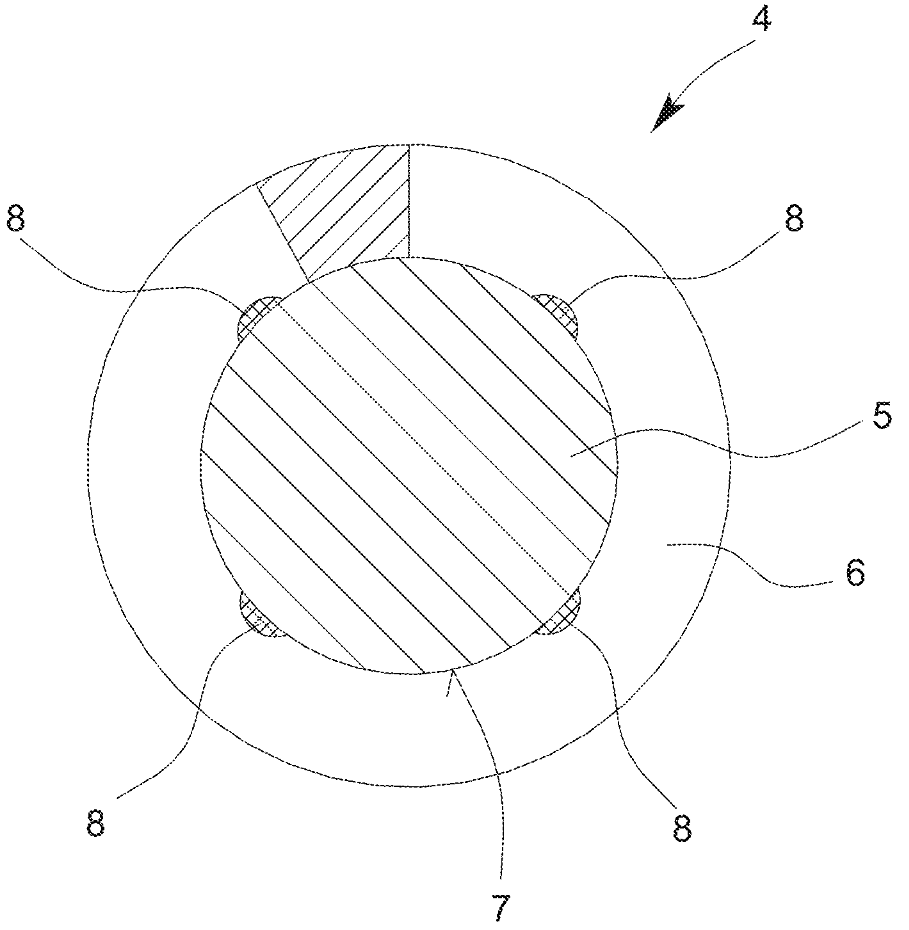

It shows:

FIG. 1 a schematic perspective view of a device according to the invention,

FIG. 2 a schematic top view of the device shown in FIG. 1,

FIG. 3 a schematic side view of the device shown in FIG. 1,

FIG. 4 a schematic perspective view of a rotary element,

FIG. 5 a schematic side view of the rotary element shown in FIG. 4,

FIG. 6 a schematic detail view of detail VI from FIG. 5,

FIG. 7 a schematic detail view of detail VII from FIG. 5,

FIG. 8 a schematic cross-sectional view of the rotary element shown in FIG. 4, FIG. 9 a schematic detail view of detail IX from FIG. 8, FIG. 10 a schematic perspective view of a further embodiment of a rotary element, FIG. 11 a schematic perspective view of the rotary element shown in FIG. 10, FIG. 12 a schematic representation of detail XII of FIG. 11, FIG. 13 a schematic representation of detail XIII from FIG. 11, FIG. 14 a schematic cross-sectional view of the rotary element shown in FIG. 11, FIG. 15 a schematic detail view of detail XV from FIG. 14, FIG. 16 a schematic perspective view of a screen deck according to the invention, FIG. 17 a schematic top view of the screen deck shown in FIG. 16, FIG. 18 a schematic side view of the screen deck shown in FIG. 16, and FIG. 19 a schematic cross-sectional view of a further embodiment of a rotary element.

FIG. 1 shows a device 1 for separating feed material 2 for separating a first fraction 3. In the embodiment example shown in FIG. 1, the fraction 3 is separated below the device 1. The first fraction 3 is formed by moist, slippery, slimy, kneadable, dough-like, cohesive and/or tough soils and/or soil materials. In particular, the first fraction 3 has clay-like or clay-containing adherents. The apparatus 1 may be further configured to separate a further fraction 22. The further fraction 22 may comprise large-sized components, in particular stones. The first fraction may be formed as an adherence to components of the further fraction 22, in particular when fed onto the device 1.

The device 1 is used in particular in a quarry.

FIG. 1 further shows that the device 1 has a plurality of rotary elements 4 formed as helical screws. A rotary element 4 has a shaft 5 and at least one helix 6 extending spirally around the shaft 5, as shown in more detail in FIGS. 5 and 11. In this context, FIGS. 5 and 11 show different embodiments of the rotatory elements 4 as they can be used in a device 1. In particular, two different groups and/or types of rotary elements 4 are used in a device 1, as will be explained in more detail below.

The further fraction 22 can in particular be separated above the screen deck 14 formed by the rotary elements 4, preferably over the end of the rotary elements 4 opposite the feed end, as shown for example in FIG. 16. The first fraction 3 can further be separated through the space between the rotary elements 4—and thus below the screen deck 14.

In FIG. 4, it is shown that an entraining element 8 projecting from the outer surface 7 of the shaft 5 is arranged and/or provided on this outer surface 7 for driving and/or separating the first fraction 3. Such an entraining element 8 is also provided in the further embodiment of the rotary element 4, as this is shown in more detail in FIG. 11.

The entraining element 8 is shown schematically in FIGS. 1 to 18 as a dashed line or as an armour-plating seam (see FIGS. 6 and 7 and FIGS. 12 and 13). This has been done for visualization reasons and does not correspond to the actual design of the entraining element 8, in particular as a weld seam. The same applies to the further entraining element 15, which will be discussed below.

Accordingly, the entraining element 8 is designed in such a way that it can draw and/or convey the first fraction 3 through the gap between directly adjacent rotary elements 4 of the screen deck 14, in particular by engaging in the first fraction 3, which is formed in particular by adhesions to components of the further fraction 22. Particularly advantageously, the entraining element 8 is provided for conveying away components containing or resembling clay. These can then be guided through the free areas between the adjacent rotary elements 4. FIGS. 4 and 11 show that the entraining element 8 extends at least substantially in the longitudinal direction L of the shaft 5. The extension may be at least substantially parallel to the longitudinal direction L of the shaft 5 or at an acute angle thereto.

FIG. 4 shows that a plurality of entraining elements 8 is provided. The entraining elements 8 can be arranged in such a way that they form a continuous line—interrupted by the helix 6—in the longitudinal direction L of the shaft 5. This line can be of monotonically rising design and result in particular from separate entraining elements 8 offset from one another, as will be explained below.

FIG. 4 further shows that a separate entraining element 8 is arranged between adjacent turns 9 of the helix 6 in each case. A turn 9 of the helix 6 extends in particular 360° circumferentially over the outer surface 7 of the shaft 5. The distance 10 between adjacent turns 9 can be bridged by the entraining element 8, which is in particular of continuous and/or uninterrupted design. In particular, between 2 to 10, preferably 3 to 5, entraining elements 8 are arranged, preferably at least substantially equally spaced in the circumferential direction between adjacent turns 9 on the outer surface 7 of the shaft 5. In the illustrated embodiment example, four entraining elements 8 are arranged around the outer circumference of the shaft 5 in the region between two adjacent turns 9. In this context, it is understood that the helix 6 is continuous and thus different arrangements of the entraining elements 8 also result at different positions of the rotational element 4. Preferably, four entraining elements 8 per free area are thus arranged between the turns 9 around the circumference—i.e. 360° circumferentially—of the shaft 5, which results in a plurality of separate entraining elements 8 over the length of the rotary element 4.

FIG. 11 shows that at least one pair of separate entraining elements 8 arranged directly one behind the other in the longitudinal direction L of the shaft 5—namely those arranged closest to each other and/or directly adjacent—are offset from each other. This offset 11 is shown in more detail in FIG. 12 and is in particular between 10 mm to 30 mm transverse to the longitudinal direction L of the shaft 5. In addition, a plurality, in the embodiment example shown in FIG. 11 all, of directly adjacent entraining elements 8—namely entraining elements 8 that are directly and closest to each other in relation to the longitudinal direction L of the shaft 5—can each be arranged offset from each other, preferably in such a way that a staircase structure results. The staircase structure can differ according to the design of the helix 5, which becomes clear when comparing FIGS. 5 and 11. The staircase structure can be designed monotonously rising—thus monotonously rising and/or falling depending on the viewing direction.

FIG. 19 shows that the entraining element 8, in cross section transverse to the longitudinal direction L of the shaft 5, is formed, at least in some areas, in the shape of an arc section at the ends and/or has a circular arc segment-shaped structure in cross section transverse to the longitudinal direction L of the shaft 5. In particular, the entraining element 8 has no sharp corners or the like. Alternatively or additionally, it can be provided that the entraining element 8 is designed as a linear and/or bead-shaped elevation that is in particular continuous and/or uninterrupted in the longitudinal direction L of the shaft 5, as shown in more detail in FIG. 4.

It is not shown that the entraining element 8 can also be designed as a strip-shaped web, which in particular can be provided independently of the shaft 5 and can be connected to the shaft 5 in a form-fitting and/or friction-fitting and/or material-fitting manner.

The entraining element 8 can have a thickness 12 of at least 1 mm and in particular between 2 and 6 mm. The maximum thickness 12 of the entraining element 8 can be less than the web height 13 of the helix 6. In particular, the entraining element 8 does not strike against the outer surface 7 of an adjacent rotary element 4 and/or the adjacent shaft 5, but a sufficiently high distance is provided from the latter. The distance between the upper edge of the helix 6 and the adjacent outer surface 7 of the adjacent helix 6 can be only a few millimeters.

As previously explained, the entraining element 8 can be connected to the shaft 5 in a material-locking and/or force-locking and/or form-fitting manner, in particular depending on the design of the entraining element 8.

In the embodiment example shown in FIG. 4, it is provided that the entraining element 8 comprises wear-resistant steel as material, in particular with a grade of 600 HB. Furthermore, in the embodiment example shown in FIG. 4, the entraining element 8 is designed as a build-up weld and/or armour-plating, namely as a build-up weld seam and/or armour-plating seam.

Furthermore, FIGS. 4 and 11 show that the helix 6 has a constant helix pitch along its length.

The rotary elements 4 can preferably be elastically mounted at both ends, as shown in FIG. 1. In addition, between 3 to 20, preferably between 4 to 10 rotary elements 4 can be provided, as is also shown in FIG. 1. The rotary elements 4 can be arranged and mounted in such a way that they form a trough-shaped and/or curved screen deck 14 that is recessed towards the center.

It is not shown in more detail that an adjusting device is provided for adjusting the angle of inclination of the screen deck 14 from the feed end to the discharge end, the adjusting device being designed in such a way that the inclination of the screen deck 14 in relation to the substrate can be varied between 0.1° and 30°. Such a change can be made to adapt to different feed materials 2.

FIGS. 4 and 10 differ in that counterclockwise and clockwise rotary elements 4 are shown. FIGS. 5 to 9, corresponding to FIG. 4, show the counterclockwise arrangement and FIGS. 11 to 14, corresponding to FIG. 10, the clockwise arrangement. In the screen deck 14, the rotary elements 4 can be arranged in such a way that they each rotate towards the center so that the feed material 2 can be conveyed into the recessed area of the trough of the screen deck 14. For this purpose, two groups of rotary elements 4 can be provided, which are designed either as counterclockwise rotating or clockwise rotating. The configuration as left-turning or right-turning rotary element 4 can be selected depending on the arrangement and the direction pointing towards the recess of the trough. Thus, rotational elements 4 immediately adjacent to each other can be left-turning and further rotational elements 4 immediately adjacent to each other can be right-turning, wherein the rotational elements 4 meeting in the recess of the trough immediately adjacent to each other can be both counterclockwise and clockwise.

The helices 6 of directly adjacent rotary elements 4 can interlock and/or mesh with each other.

As previously explained, the rotary elements 4 forming the screen deck 14 are arranged and designed in such a way that the feed material 2 is separated into at least two fractions, the first fraction being separable below the rotary elements 4 and a further fraction 22 being dischargeable above the screen deck 14, in particular via the discharge end of the rotary elements 4.

FIGS. 13 and 7 show a further entraining element 15 for the two different embodiments of the rotary elements 4, which serves to convey feed material located in the area of the feed end back into the area of the helices 6. This area of the rotary element 4 can in particular be arranged behind a wall, which is shown in more detail in FIG. 1. Feed material that gets under this wall is then to be conveyed out over the further entraining elements 15. For this purpose, these can be arranged at an angle to the longitudinal direction L of the shaft 5, in particular between 4° to 30°. The formation of the angle then also depends on whether the rotary elements 4 are counterclockwise or clockwise.

FIGS. 9 and 15 show that a wear element 16 is arranged on the upper edge of the helix 6 at least in some areas, preferably over the entire surface, and in particular extends at least substantially over the length of the helix 6. The wear element 16 can also be designed as a build-up weld, just like the further entraining element 15. The wear element 16 can furthermore increase the wear resistance of the helix 6.

Use of the device 1 in a quarry is not shown in detail, but is preferred.

FIG. 16 shows a schematic perspective view of screen deck 14, with FIG. 17 showing a top view of screen deck 14 and FIG. 18 showing a corresponding side view.

The overall device 1 shown in FIGS. 1 to 3 comprises, in addition to the screen deck 14, further components of the device 1, such as, for example, a feed hopper 17 which, together with a conveying device 19, feeds the feed material to the screen deck 14. In addition, a further conveying device 20 can also be provided for conveying away the further fraction 22, which is designed in particular as a circulating conveyor belt. Suitable conveying means 21 can also be used for conveying away the first fraction 3, which can also be designed as conveyor belts.

The device 1 can be designed to be mobile and/or movable, for which it can in particular have a chassis 18, preferably a crawler chassis. Thus, a mobile device 1 can also be provided, which can be transported to different locations.

FIG. 16 shows that in a further preferred embodiment, the device 14 can have a retaining means 23, which in the embodiment shown in FIG. 16 is in the form of a plate. The retaining means 23 may be arranged in the region of the ends of the rotational elements 4 opposite the feed end and may be at least slightly spaced from the rotational elements 4. The retaining element 23 can preferably extend over part of the width of the screen deck 14, so that preferably also rotational elements 3, in particular the outer rotational elements 4 of the screen deck 14 are not arranged directly below the retaining means 23. In particular, the retaining means 23 may be arranged in the recessed area of a curved screen deck. The retaining means 23 may further be configured such that at least substantially no material and/or components of the further fraction 22 can be conveyed away via the retaining means 23, these components preferably having to be conveyed first to the outermost rotatory elements 4 of the screen deck 14. Accordingly, the retaining means 23 can increase the residence time of the further fraction 22 on the screen deck 14.

LIST OF REFERENCE SIGNS

1 Device
2 Feed material
3 First faction
4 Rotary elements
Shaft
6 Helix
7 Outer surface from 5
8 Entraining element
9 Turn of 5
Distance between 9
11 Offset
12 Thickness of 8
13 Web height of 6
14 Screen deck
Further entraining element
16 Wear element
17 Feed hopper
18 Chassis
19 Conveying device for 2
Other conveying device for 22
21 Conveying means for 3
22 Other fraction
23 Retaining means
L Longitudinal direction from 5

The invention claimed is:

1. A device configured to separate feed material in a quarry, the device configured to separate a first fraction of soil materials comprising:

a plurality of rotary elements, wherein the rotary elements are helical screws, wherein each rotary element includes a shaft and at least one helix extending spirally around each of the respective shafts, wherein at least one entraining element is arranged on an outer surface of each of the respective shafts and projects from the outer surface of each of the respective shafts, the at least one entraining element configured to one or more of entrain and separate the first fraction, wherein the entraining element is one or more of a linear, bead-shaped elevation, and a strip-shaped web which is one or more of continuous and uninterrupted in a longitudinal direction of teach of the respective shafts, wherein the at least one entraining element has a thickness of at least 1 mm, and wherein the at least one entraining element is one or more of a build-up welding and armor plating.

2. The device according to claim 1, wherein:

the at least one entraining element extends in the longitudinal direction of each of the respective shafts, the at least one entraining element extends parallel to the longitudinal direction of each of the respective shafts, or the at least one entraining element extends at an acute angle relative to the longitudinal direction of an outer surface of each of the respective shafts.

3. The device according to claim 1, wherein at least one separate entraining element is arranged between respective adjacent turns of each helix, and at least bridges a distance between adjacent turns of theeach helix, wherein between 2 to 10 entraining elements are arranged equally spaced between two directly adjacent turns in the circumferential direction.

4. The device according to claim 1, wherein one or more of:

at least one pair of separate entraining elements arranged directly one behind the other in the longitudinal direction of each of the respective shafts are arranged offset relative to one another, wherein the offset transverse to the longitudinal direction of each of the respective shafts is between 1 mm and 80 mm, and wherein a plurality of separate entraining elements directly adjacent in the longitudinal direction of each of the respective shafts are each arranged offset relative to one another to create a staircase structure.

5. The device according to claim 1, wherein the at least one entraining element has, in portions, in a cross section transverse to the longitudinal direction of each of the respective shafts, a shape of an arcuate section at an end.

6. The device according to claim 1, wherein the at least one entraining element has a thickness between 1 mm and 15 mm, and/or that a maximum thickness of the entraining element is less than a web height of the helix.

7. The device according to claim 1, wherein the at least one entraining element is connected to each of the respective shafts in a substance-locking and/or force-locking and/or form-fitting manner.

8. The device according to claim 1, wherein the at least one entraining element has as material wear-resistant steel with a grade of 300 HB to 600 HB, and/or the at least one entraining element is a build-up welding seam and/or armor plating seam.

9. The device according to claim 1, wherein between 3 to 20, rotary elements are provided, and/or the rotary elements are arranged and/or mounted in such a way that they form a trough-shaped and/or curved screen deck which is recessed towards the center.

10. The device according to claim 9, wherein an adjusting device is configured to adjust an angle of inclination of the screen deck from the feed end to the discharge end, wherein the adjusting device is configured so that an inclination of the screen deck in relation to the substrate can be varied between 0° and 40°.

11. The device according to claim 9, wherein the rotary elements forming the screen deck are configured such that the feed material is separated into at least two fractions, the first fraction being separable below the rotary elements and a further fraction being dischargeable above the screen deck via a discharge end of the rotary elements.

12. The device according to claim 1, wherein at least two directly adjacent rotary elements are arranged in counter-clockwise rotation and two at least further directly adjacent rotary elements are arranged in clockwise rotation.

13. The device according to claim 1, wherein the helices of directly adjacent rotary elements engage and/or mesh with each other.

14. The device according to claim 1, wherein a further entraining element is arranged in the region of a feed end of the rotary element, which is arranged obliquely at an angle of between 4° and 30° with respect to the longitudinal direction of the shaft.

15. The device according to claim 1, wherein a wear element is arranged on a portion of an upper edge of each helix.

16. The device according to claim 1, wherein a wear element is arranged on an entirety of an upper edge of each helix.

17. The device according to claim 1, wherein a wear element is arranged over an entire length of each helix.

18. The device according to claim 1, wherein the first fraction includes clay-containing adhesions.

19. The device according to claim 1, wherein the device is configured for lime extraction.

* * * * *